United States Patent [19]

Juri et al.

[11] Patent Number: 5,585,931
[45] Date of Patent: Dec. 17, 1996

[54] VIDEO SIGNAL RECORDING DATA OVERFLOW ALLOCATION APPARATUS AND METHOD

[75] Inventors: Tatsuro Juri, Osaka; Masakazu Nishino, Kashiwara, both of Japan

[73] Assignee: Matsushita Electric Industrial Co., Ltd., Osaka, Japan

[21] Appl. No.: 483,570

[22] Filed: Jun. 7, 1995

Related U.S. Application Data

[63] Continuation of Ser. No. 155,131, Nov. 22, 1993, abandoned.

[30] Foreign Application Priority Data

Nov. 24, 1992 [JP] Japan ..................................... 4-313068
Nov. 24, 1992 [JP] Japan ..................................... 4-313069

[51] Int. Cl.$^6$ .............................. H04N 9/79; H04N 5/78; H04N 7/12; H04N 11/02
[52] U.S. Cl. .............................. 386/33; 348/403; 386/109
[58] Field of Search ..................................... 358/335, 310, 358/426, 430, 431, 432, 433, 342; 382/56; 348/384, 390, 403, 409, 420, 396, 408, 206; 360/9.1; H04N 5/76, 5/78, 5/781, 5/782, 5/783, 5/92, 9/79, 7/12

[56] References Cited

U.S. PATENT DOCUMENTS

| | | |
|---|---|---|
| 4,907,101 | 3/1990 | Keesen et al. . |
| 4,954,892 | 9/1990 | Asoi et al. ................................. 348/390 |
| 5,047,852 | 9/1991 | Hunyu et al. ............................. 348/408 |
| 5,237,424 | 8/1993 | Nishino et al. .......................... 348/396 |
| 5,239,308 | 8/1993 | Kessen . |
| 5,272,528 | 12/1993 | Juri et al. ................................ 348/403 |

FOREIGN PATENT DOCUMENTS

| | | |
|---|---|---|
| 0492537 | 7/1992 | European Pat. Off. . |
| 0554871 | 8/1993 | European Pat. Off. . |
| 2648978 | 12/1990 | France . |
| 91-02430 | 2/1991 | WIPO . |

OTHER PUBLICATIONS

"Adaptive Coding of Monochrome and Color Images", W. Chen and C. H. Smith, IEEE Transactions on Communications, vol. COM–25, No. 11, pp. 1285–1292 (Nov. 1977).
*Proceedings of the SPIE, Image Processing Algorithms and Techniques*, "Overview of the JPEG (ISO/CCITT) Still Image Compression Standard"(Wallace), pp. 220–233, which was published in Feb. 1990 in Santa Clara, California, USA.
European Search Report and Annex.

*Primary Examiner*—Thai Q. Tran
*Attorney, Agent, or Firm*—Greenblum & Bernstein P.L.C.

[57] ABSTRACT

A video signal recording apparatus has a variable length coding unit for producing a plurality of data blocks having uneven data length. A main memory has a plurality of allocated memory areas of known capacity for storing one block data in one allocated memory area. The data that has overflown from the allocated memory area are temporarily stored in a overflow memory. The data in the overflow memory are stored back in the main memory in vacant spaces at the end portion of some of the allocated memory areas.

17 Claims, 5 Drawing Sheets

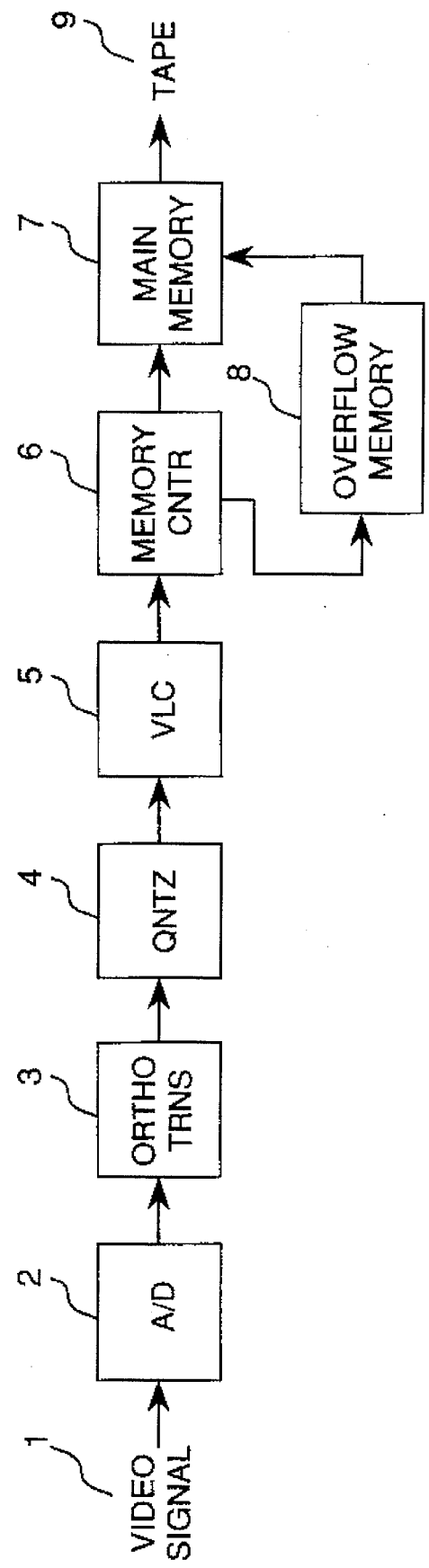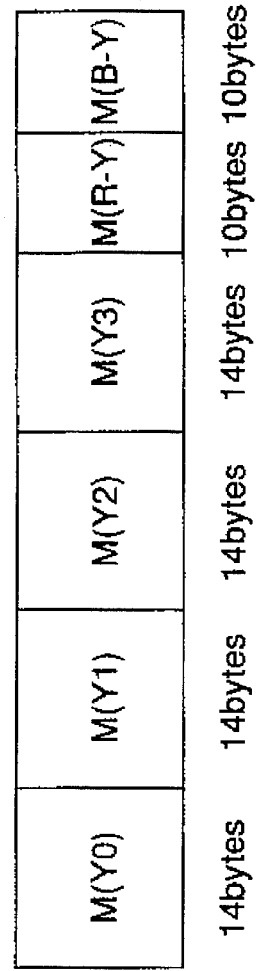

VIDEO SIGNAL RECORDING DATA OVERFLOW ALLOCATION APPARATUS AND METHOD

This application is a continuation of application Ser. No. 08/155,131, filed Nov. 22, 1993, now abandoned.

BACKGROUND OF THE INVENTION

1. Field of the Invention

The present invention is related to a video signal recording apparatus and method used for recording or transmitting a video signal using bit rate reduction.

2. Description of the Prior Art

One known method of reducing the data amount of a video signal uses bit rate reduction coding. Bit rate reduction is a coding method for reducing the data amount by removing the features of the video signal.

One specific bit rate reduction method forms blocks of plural adjacent pixels and compresses the data by performing an orthogonal transform on each data block. The blocks to which this orthogonal transform is applied are called the "orthogonal transform blocks." To improve the compression efficiency of this orthogonal transformation data, variable length coding is applied to each of the orthogonal transform blocks prior to recording or transmission (W. Chen and C. H. Smith: "Adaptive Coding of Monochrome and Color Images," IEEE Trans. Commun., COM-25, 11, pp. 1285–1292 (Nov. 1977)).

However, if variable length coding is used and a playback error occurs, it is not possible to decode the data following the error. In addition, the data can also be reproduced only within a narrow band during high speed (trick) playback modes on a conventional video cassette recorder (VCR). Decoding of more data is not possible in this case because it is not clear where on screen the decoded (reproduced) data is to be displayed. It is therefore difficult to use variable length coded data with conventional VCRs.

SUMMARY OF THE INVENTION

Therefore, the object of the present invention is to provide a video signal recording apparatus and method using bit rate reduction suitable for devices such as VCRs in which reproduction errors are frequent and which require high speed and other trick playback modes.

To achieve this object, a video signal recording apparatus according to the present invention comprises: variable length coding means for producing a plurality of data blocks having uneven data length, each data block comprising an end of block data at the end of each data block and a plurality of variable length coded data, each variable length coded data accompanying a data length code indicative of data length of a corresponding variable length code; first memory means having a plurality of allocated memory areas of known capacity for provisionally storing one block data in one allocated memory area; second memory means for storing overflow data that has overflown from an allocated memory area; data block length counting means for counting each data block length and for producing a maximum length signal when said variable length coding means has produced a predetermined length of data equal to a capacity of a corresponding allocated memory area; switching means operated by said data block length counting means for directing and storing said data block to an allocated memory area before the generation of said maximum length signal and for directing and storing overflow portion of said data block to said second memory means; end of block data detection means for detecting the end of block data and for pointing a new allocated memory area upon detection of the end of block data, so that a vacant area is produced at end portion of said allocated memory when said end of block data is detected before the generation of said maximum length signal; and transfer means for transferring overflow data stored in said second memory means to said vacant area.

Also, a video signal recording method according to the present invention comprises the steps of: (a) producing a plurality of data blocks having uneven data length from a variable length coding means, each data block comprising an end of block data at the end of each data block and a plurality of variable length coded data, each variable length coded data accompanying a data length code indicative of data length of a corresponding variable length code; (b) sending said data blocks to a first memory means having a plurality of allocated memory areas of known capacity for provisionally storing one block data in one allocated memory area; (c) pointing a new allocated memory area when said end of block data is detected, and leaving a vacant area at end portion of old allocated memory area; (d) sending overflow data of said data blocks that has overflown from an allocated memory area for storing the overflow data in a second memory means; and (e) transferring overflow data stored in said second memory means to said vacant area in said first memory means.

Thus, the effects of reproduction errors can be decreased and bit rate reduction compatible with high speed (trick) playback modes is made possible by means of the invention.

BRIEF DESCRIPTION OF THE DRAWINGS

The present invention will become more fully understood from the detailed description given below and the accompanying diagrams wherein:

FIG. 1a is a block diagram of a video signal recording apparatus according to the first embodiment of the invention.

DESCRIPTION OF PREFERRED EMBODIMENTS

Figure 1B:
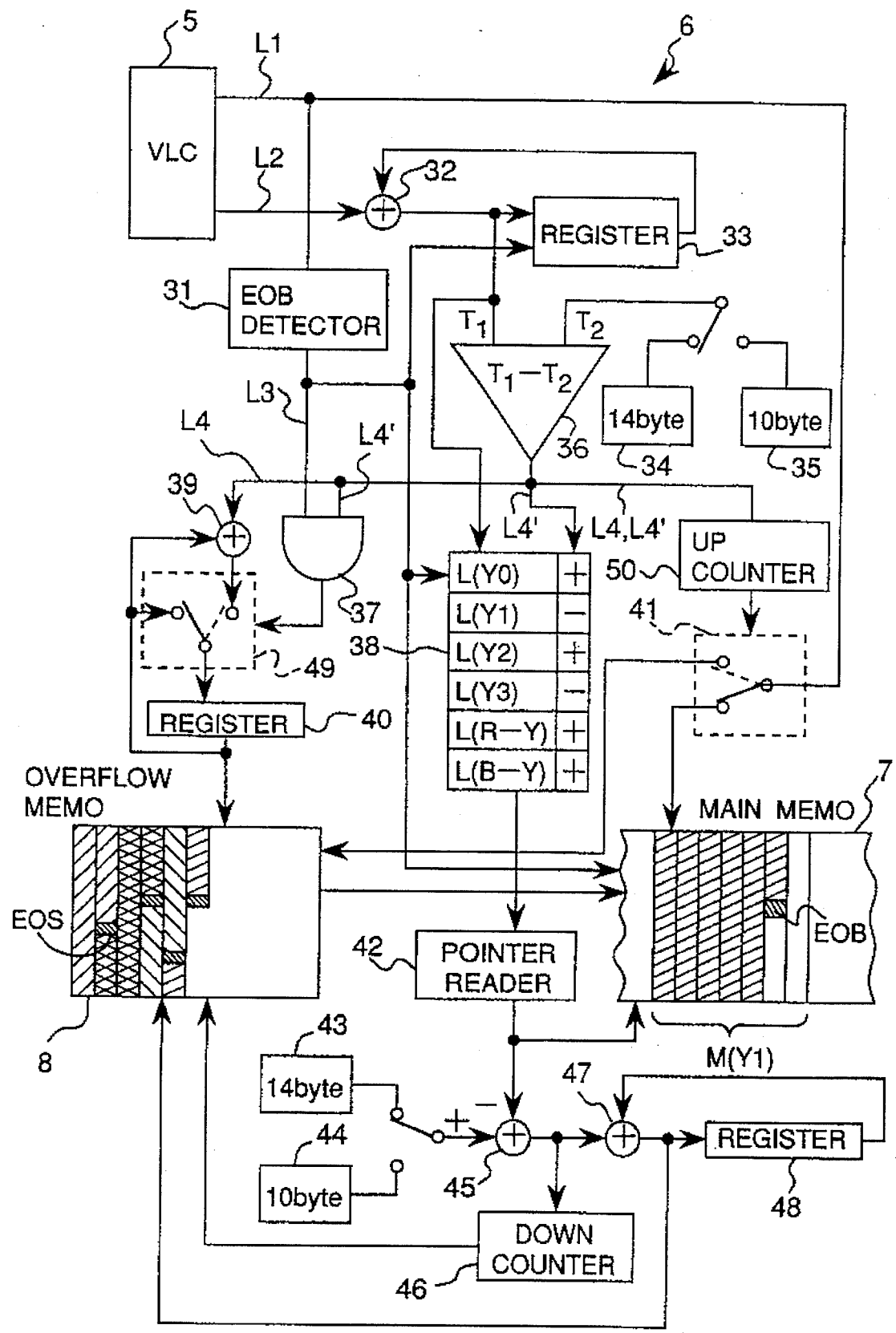
FIG. 1b is a detailed block diagram of the memory control shown in FIG. 1a, FIG. 2 is a diagram used to describe the macro block recording area and orthogonal transform block recording area of the invention.

The preferred embodiments of the invention are described below with reference to the accompanying figures. The present embodiment is described as applied to a television signal transmitted by a 525/60 system. It is assumed in this embodiment that the video signal is bit rate reduced and recorded independently each frame, and the frame luminance signal comprises 720 horizontal pixels by 480 vertical lines. Each orthogonal transform block is the data for 64 pixels in a matrix of eight horizontal pixels by eight vertical lines. As a result, 5400 orthogonal transform blocks are formed for the luminance signal in one frame.

For the two color difference signals (R-Y and B-Y), each orthogonal transform block is formed from the orthogonal transform blocks of four adjacent luminance signals and the pixels contained in the same area on screen. One macro block is formed from six orthogonal transform blocks, specifically, four luminance signal orthogonal transform blocks located adjacent to each other in two by two area, one R-Y signal block obtained from the same two by two area, i.e., the area covering the four luminance signal orthogonal transform blocks, and one B-Y signal block also obtained from the same two by two area. One frame therefore comprises 1350 macro blocks.

FIG. 1a is a block diagram of a video signal recording apparatus according to the first embodiment of the invention. As shown in FIG. 1a, this apparatus comprises a video signal input 1, an analog/digital (A/D) converter 2, orthogonal transform processor 3, quantizer 4, variable length coding unit 5, memory control 6, main memory 7, overflow memory 8, and magnetic tape 9.

The analog video signal input from the video signal input 1 is converted to a digital signal by the A/D converter 2. The video signal converted to a digital signal is then processed by the orthogonal transform processor 3 to form orthogonal transform blocks of plural adjacent pixels, and an orthogonal transform operation is applied. A discrete cosine transform is normally applied as the orthogonal transform in this embodiment, but a wavelet transform or other method can also be applied.

After the orthogonal transform operation of the orthogonal transform processor 3, the data is quantized in quantizer 4 to control the data amount and, thereafter, is variable length coded in orthogonal transform block units by the variable length coding unit 4. The data is thus converted to a data amount that is variable by orthogonal transform block. Thus, with respect to one macro block, four luminance signal orthogonal transform blocks Y0, Y1, Y2, and Y3, and two color difference signal orthogonal transform blocks R-Y and B-Y are produced from the variable length coding unit 5. Because the data in these blocks are processed in the variable length coding unit 5, the data length of each block is not fixed. An average data length of blocks Y0, Y1, Y2 and Y3 is roughly about 14 bytes, and an average data length of blocks R-Y and B-Y is roughly about 10 bytes.

Referring to FIG. 2, main memory 7 is shown which is for storing the orthogonal transform data in macro block units based on a known recording format. The main memory 7 has at least 76-byte capacity, and is divided into six areas M(Y0), M(Y1), M(Y2), M(Y3), M(R-Y) and M(B-Y) which are for mainly storing, respectively, the four luminance signal orthogonal transform blocks Y0, Y1, Y2, and Y3, and two color difference signal orthogonal transform blocks R-Y and B-Y. More specifically, 14 bytes are allocated to each of the luminance signal orthogonal transform blocks Y0, Y1, Y2, and Y3, and 10 bytes are allocated to the recording areas for the color difference signal orthogonal transform blocks R-Y and B-Y.

Figure 3A:
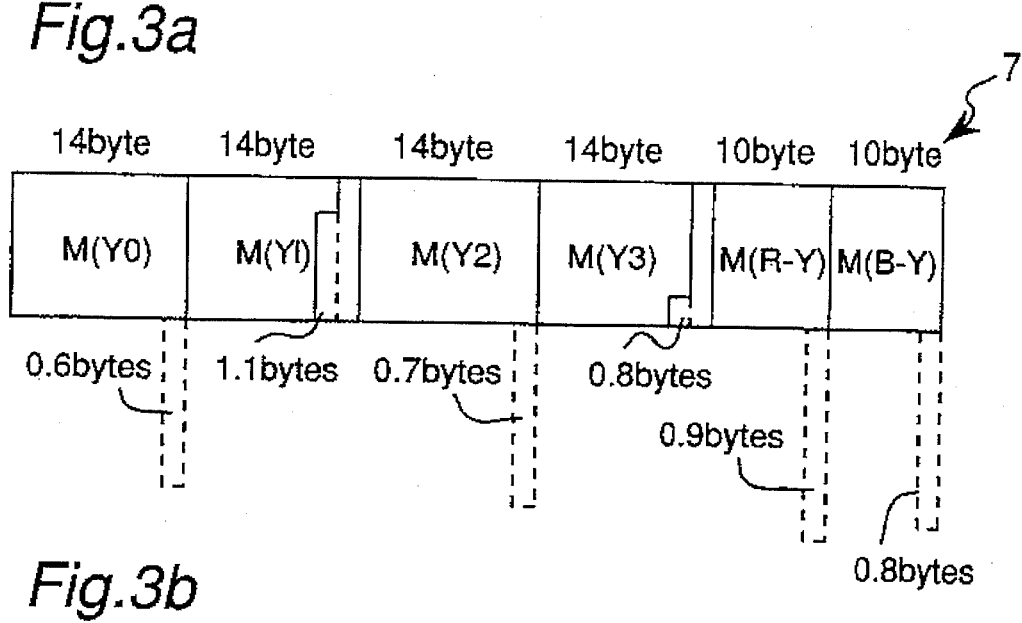
FIGS. 3a–3d are diagrams used to describe the method of recording non-essential data to macro blocks according to the first embodiment.

For example, when the blocks Y0, Y1, Y2, Y3, R-Y and B-Y have the data length of 14.6 byte, 12.9 byte, 14.7 byte, 13.2 byte, 10.9 byte and 10.8 byte, respectively, it is understood that the data in the blocks Y0, Y2, R-Y and B-Y overflows with respect to the allocated memory areas M(Y0), M(Y2), M(R-Y) and M(B-Y) presented in the main memory 7 by the amount of 0.6 byte, 0.7 byte, 0.9 byte and 0.8 byte, respectively, as diagrammatically shown in FIG. 3a. Also, the memory areas M(Y1) and M(Y3) still have vacant spaces of 1.1 byte and 0.8 byte. The overflow data is temporarily stored in the overflow memory 8, and is filled back in the vacant spaces in the main memory 7, as diagrammatically shown in FIG. 3c. The control of the overflow data is carried out in the memory control 6 as will be described in detail later in connection with FIG. 1b.

In the example shown in FIG. 2, the entire macro block recording area is allocated to the orthogonal transform block recording areas included in the macro block, but areas not associated with the orthogonal transform block recording area can also be reserved in the macro block recording area.

In this embodiment, there are 1350 macro block recording areas as illustrated in FIG. 2 in each frame. By recording the macro blocks and orthogonal transform blocks to a fixed recording position, the effect of transfer path errors is minimized and recording suited to high speed (trick) playback modes is possible.

Referring to FIG. 1b, a detail of the memory control 6 is shown which is connected to the variable length coding unit 5. First, the process carried out in the variable length coding unit 5 is explained.

For example, and for the purpose of easy understanding of the present invention, it is assumed that the variable length coding unit 5 produces, for each of blocks Y0, Y1, Y2, Y3, R-Y and B-Y, along line L1 a train of 3-bit auxiliary data, 9-bit DC data (zero frequency data), one or more AC data (variable length coded data, each being 3–16 bit long) and 4-bit EOB (end of block) signal. AC data are aligned in the order of frequency, from low to high. Thus, the total length of each block is 9 plus 3 plus the total length of all the AC data plus 4. Also, with respect to each AC data, the variable length coding unit 5 produces along line L2 code length data indicative of the bit length of the corresponding AC data which is being produced from line L1.

Line L1 is connected through a switch 41 to the main memory 7 and overflow memory 8. In response to each EOB signal, a pointer (not shown) points a starting position of a new allocated area in the main memory 7. For example, in response to the EOB signal produced at the end of block Y0, the pointer points the starting position of the next allocated area M(Y1) for storing the data of block Y1. While the data of the block is not filled in the allocated area, the switch 41 is maintained in a position shown by a real line in FIG. 1b. However, if the data of the block is filled up in the allocated area, the switch 41 is turned to a position shown by a dotted line to send the overflow data to overflow memory 8. The switching of the switch 41 is controlled by a down counter 50 as will be described in detail later.

The line L1 is connected to an EOB detector 31 for detecting EOB signal at the end of each of blocks Y0, Y1, Y2, Y3, R-Y and B-Y, and for producing a HIGH level signal along line L3 upon detection of the EOB signal.

The line L2 is connected to an adder 32 which is connected to a register 33 and also to a comparator 36. The register 33 is reset in response to each detection of EOB signal. When the register 33 is reset, it is automatically stored with "12" representing the fixed length of the 3-bit auxiliary data and 9-bit DC data in each block. Each time the code length data is produced along line L2, adder 32 adds code length date with the data carried in register 33 and stores the sum in register 33. The sum is also applied to terminal T1 of comparator 36. Terminal T2 of comparator 36 receives data indicative of "14 byte" from a data generator 34 when a block Y0, Y1, Y2 or Y3 is being processed, and data indicative of "10 byte" from a data generator 35 when a block R-Y or B-Y is being processed.

In comparator 36 a subtraction T1-T2 (T1, T2 also represents the data applied to respective terminals) is carried out. The difference, as well as the "+" or "−" sign of the difference, is produced from comparator 36. For example, the output line from comparator 36 is a parallel multi-bit line in which the most significant bit (MSB) is used for the "+" or "−" sign of the difference, and the remaining bits are used for the difference. The MSB is HIGH when the difference is "+", that is when the overflow is taking place, and LOW when it is "−", that is when the allocated area in the main memory is not yet filled. The MSB representing the "+" or "−" sign of the difference is applied along line L4' to each of AND gate 37 and pointer register 38. The remaining bits of the output from comparator 36 represents the difference itself is applied along line L4 to an adder 39. Also, both L4 and L4' are applied to an up counter 50.

Up counter 50 counts up from the data applied thereto through lines L4 and L4' in accordance with the clock used for sequentially producing the variable length code along line L1. When up counter 50 counts up to zero, the switch 41 is turned from the position shown by the real line to the position shown by the dotted line. Thereafter, as long as the up counter 50 is producing a "+" sign, the switch 41 is maintained in the dotted line position.

AND gate 37 also receives a HIGH or LOW level signal from EOB detector 31 along line L3, and produces a signal to switch 49. The output from switch 49 is applied to a register 40 which is reset after the processing of one macro block, i.e., after processing blocks Y0, Y1, Y2, Y3, R-Y and B-Y. The output of register 40 is applied to the overflow memory 8 for controlling the address, and also to adder 39 and switch 49. When the output from the AND gate 37 is a LOW level signal, that is when the overflow is not taking place or when the EOB signal is not detected, switch 49 is turned to a position shown by a real line in FIG. 1b so that the output of register 40 is connected to its input to maintain its contents without any change. On the other hand, when the output from the AND gate 37 is a HIGH level signal, that is when the overflow is taking place and when the EOB signal is detected at the end of the block, switch 49 is turned to a position shown by a dotted line in FIG. 1b so that the output of register 40 is connected to adder 39 to add the contents of the register with the amount of overflow. According to the above example, in the case of block Y0, the amount of overflow at the time the EOB signal of block Y0 is produced is 0.6 byte. Thus, in register 40, a sum of zero plus 0.6 byte is stored.

The pointer register 38 has areas L(Y0), L(Y1), L(Y2), L(Y3), L(R-Y) and L(B-Y) for storing the total length data of blocks Y0, Y1, Y2, Y3, R-Y and B-Y, respectively, and also for storing the data representing "+" or "−" sign, i.e., overflow or non-overflow. According to the above example, areas L(Y0), L(Y1), L(Y2), L(Y3), L(R-Y) and L(B-Y) are stored with 14.6 byte, 12.9 byte, 14.7 byte, 13.2 byte, 10.9 byte and 10.8 byte, respectively, and also signs "+", "−", "+", "−", "+" and "+" are stored at areas corresponding to areas L(Y0), L(Y1), L(Y2), L(Y3), L(R-Y) and L(B-Y).

The output of the EOB detector 31 is also connected to main memory 7. In response to each HIGH level signal along line L3 produced upon detection of the EOB signal, a pointer (not shown) for pointing a storing position in the main memory 7 is shifted to a starting point of the next allocated area. Thus, when the EOB signal is produced before the up counter 50 counts up to zero, there will be a vacant space produced at the end portion of the allocated area.

Still referring to FIG. 1b, the output of the pointer register 38 is connected to pointer reader 42 which reads the total length data, but only with those accompanying "−" sign. According to the example shown, the pointer reader 42 reads total length data from areas L(Y1) and L(Y3) which accompany "−" sign. The output of pointer reader 42 is applied to the main memory 7 for pointing a place after the EOB of a particular allocated area. For example, when the total length data from area L(Y1), i.e., 12.9 bytes, is read by the pointer reader 42, the output of the pointer reader 42 selects the allocated area M(Y1) in the main memory 7 and point a place after the EOB of the block Y1 by reading the total length of the block Y1. The space in the selected allocated area after the EOB is the vacant space. Thus, the place pointed by the pointer reader 42 is a starting point of the vacant space (in this example, 1.1 byte) in the allocated area M(Y1).

The output of the pointer reader 42 is also applied to a subtracter 45 for subtracting the total length from the maximum length of the allocated area. For example, the maximum length of the allocated area M(Y1) is 14 byte, because the allocated area M(Y1) has the capacity of 14 byte. Thus, according to the above example, the subtracter 45 subtracts 12.9 bytes from 14 bytes, and the obtained difference 1.1 byte is applied to a down counter 46 and also to an adder 47.

The down counter 46 is reset to the difference produced from the subtracter 45 and is used for controlling the data transfer from overflow memory 8 to main memory 7 to completely fill up the vacant area with the data in the overflow memory 8.

The adder 47 is further connected to a register 48. Register 48 is reset after the processing of one macro block, and is used for controlling the data transfer from overflow memory 8 to main memory 7 to indicate how far the overflow memory 8 has been read.

Next, the operation of the memory control 6 is explained in two phases. In the first phase, the data from the variable length coding unit 5 is stored in the main memory 7 and some in the overflow memory 8. In the second phase, the data stored in the overflow memory 8 is stored in the main memory 7 in the vacant spaces.

It is assumed that blocks Y0, Y1, Y2, Y3, R-Y and B-Y having the data length of 14.6 byte, 12.9 byte, 14.7 byte, 13.2 byte, 10.9 byte and 10.8 byte, respectively, are produced sequentially from the variable length coding unit 5.

First Phase

At first, the main memory 7 and the overflow memory 8 are completely empty. The main memory 7 is pointed by a pointer (not shown) at the starting point of the first allocated area M(Y0) and the overflow memory 8 is pointed by the register 40 at its starting point zero. At this time, comparator 36 produces along lines L4 and L4' data indicative of −14 byte. Thus, the switch 41 is turned to the position shown by the real line, because the up counter 50 has not yet counted up to zero.

Then, for the first block Y0, transmitted along line L1 is a train of 3-bit auxiliary data, 9-bit DC data, one or more AC data and 4-bit EOB signal. Also, transmitted along line L2 is the code length data indicative of the bit length of the corresponding AC data which is being produced from line L1. Each time a new code length data is applied to adder 32, the data stored in register increases. Thus, the data produced from comparator 36 increases and become closer to zero.

Assuming that the data in the register 33 has been increased to 14 byte minus 4 bits, and the next AC data has a bit length of 7 bits. The data indicative of minus 4 bits is applied along line L4, L4' to up counter 50. Thus, the up counter 50 counts up from minus 4 during the next transmission of the 7-bit long VLC data. When 4 bits of the 7-bit long VLC data is transmitted through switch 41, switch 41 is turned from the real line position to the dotted line position so that the remaining 3 bits are transmitted to the overflow memory 8. In this manner, the allocated area M(Y0) in the main memory 7 is completely filled. Thereafter, further remaining data in the block Y0 is stored in the overflow memory 8.

At the end of the block Y0, EOB signal is produced so that the pointer register 38 stores the total length data of the block Y0 as carried in register 33, together with sign "+" indicating the overflow. Also, in response to the EOB signal, switch 49 is turned from the real line position shown in FIG. 1b to the dotted line position. Thus, the adder 39 adds the contents of the register 40 with the total amount of overflow for the first block Y0. According to the above example, the total amount of the overflow for the first block Y0 is 0.6 byte which is added with the contents, zero. Thus, in response to the EOB signal of the first block Y0, register 40 stores 0.6 byte which is used in the overflow memory 8 to point an end point of the place where the overflow data has been filled. In FIG. 1b, overflow memory 8 has a left down slope hatching portion representing the overflow data of the first block Y0.

Also, by the detection of EOB signal, register 33 is reset to the initial value "12". Thus, the switches 41 and 49 are turned to their real line position.

Then, the data of the next block Y1 having a length of 12.9 byte is produced from the variable length coding unit 5. Since block Y1 has a length less than 14 byte, no overflow take place for block Y1. Thus, register 40 continues to produce the same data, i.e., 0.6 byte, and the pointer register 38 stores the total length data of the block Y1, i.e., 12.9 byte, as carried in register 33 together with the "−" sign indicating the no overflow. Also, in the allocated area M(Y1) in the main memory 7, there will be a vacant space of 1.1 byte after the EOB signal.

Then, the data of the next block Y2 having a length of 14.7 byte is produced from the variable length coding unit 5. When 14 byte data of block Y2 is stored in the allocated area M(Y2), switch 41 is turned to the dotted line position to store the overflow data in the overflow memory 8. Since register 40 is pointing the end point of the place where the overflow data has been filled so far, the new overflow data will be added after the end point. Then, when the EOB signal of block Y2 is produced, the data in register 40 is increased to point the new end point, i.e., 1.3 byte (=0.6+0.7). Also, the pointer register 38 stores the total length data of the block Y2, i.e., 14.7 byte, as carried in register 33 together with the "+" sign indicating the overflow.

In this manner, data in the remaining blocks Y3, R-Y and B-Y are stored in the main memory 7 and the overflow memory 8. Also, the pointer register 38 stores the total length together with "+" or "−" sign for each of blocks Y3, R-Y and B-Y.

Second Phase

After the data for one macro block are stored in main memory 7 and overflow memory 8, pointer reader 42 reads the pointer register 38 particularly the data accompanying a "−" sign. Thus, the first data read from the pointer register 38 is from area L(Y1) carrying 12.9 byte. The read data is used for pointing the end point of the data stored in the allocated area M(Y1) in the main memory 7, i.e., the starting point of the vacant space in the allocated area M(Y1). Then, 12.9 byte is subtracted from 14 byte in subtracter 45. The difference 1.1 byte is used for the initial setting of the down counter 46, and is also added to the contents of register 48.

As the down counter 46 counts down, the data stored in the overflow memory 8 is transferred to the vacant space in the allocated area M(Y1). When the down counter 46 has counted down to zero, the vacant space in the allocated area M(Y1) is completely filled. Also, the data (1.1 byte) stored in register 48 is used for pointing the overflow memory 8 to indicate how far the data in overflow memory 8 has been transferred.

Then, the second data is read from the pointer register 38, which is from area L(Y3) carrying 13.2 byte. The read data is used for pointing the end point of the data stored in the allocated area M(Y3) in the main memory 7, i.e., the starting point of the vacant space in the allocated area M(Y3). Then, 13.2 byte is subtracted from 14 byte in subtracter 45. The difference 0.8 byte is used for the initial setting of the down counter 46, and is also added to the contents of register 48. Thus, the register 48 will be increased to 1.9 byte.

As the down counter 46 counts down, the data stored in the overflow memory 8 is taken out from the previously pointed position by the register 48 and is transferred to the vacant space in the allocated area M(Y3). When the down counter 46 has counted down to zero, the vacant space in the allocated area M(Y3) is completely filled. Also, the data (1.9 byte) stored in register 48 is used for pointing the overflow memory 8 to indicate how far the data in overflow memory 8 has been transferred.

A further remaining data in the overflow memory can be added to a vacant space in a different area in the main memory 7 for storing a different macro block.

By the present invention as described above, since the data of blocks Y0, Y1, Y2, Y3, R-Y and B-Y stored in the main memory 7 start from a fixed position, the data in the beginning portion of each block can be saved with a high percentage even when data in some blocks are destroyed or skipped.

In the above description, during the first phase, the data stored in the main memory are also referred to as essential data and the data stored in the overflow memory are also referred to as non-essential data.

The essential data and non-essential data can be defined as follows.

Auxiliary data contained in each orthogonal transform block and required to decode the orthogonal transform blocks is essential data. As other essential data, the code length is sequentially added to the data amount of the auxiliary data from the code word expressing the lowest frequency band, and the code word data filling the available area of the orthogonal transform block recording area (FIG. 2) is also essential data. If the recording area is filled before the last code word is recorded, the essential data is limited to the data recorded up to that last code word (the essential data can be defined at each code word). Conversely, code word data that is not defined as essential (relatively high frequency data that cannot be recorded in the orthogonal transform block recording area) is defined as non-essential data.

Low frequency distortion is relatively obvious visually, but high frequency distortion is not as easily detected. By thus switching the data path by switch 41 as essential or non-essential by the above embodiment, image deterioration can be reduced even when only the essential data is reproduced. The orthogonal transform block recording area for the luminance signal in the example in FIG. 2 is greater than the orthogonal transform block recording area for the color difference signal. It is thereby possible to record more visually essential luminance signal data, and image deterioration when only the essential data is reproduced can be further reduced.

The method of positioning the non-essential data is described next with reference to FIGS. 3a–3d. FIG. 3a shows the state of the macro block recording area to which the essential data has been positioned in the main memory 7. The overflow data, i.e., non-essential data are shown by dotted line. In FIG. 3a the data amount of orthogonal transform blocks Y1 and Y3 is less than the available recording area, and vacant spaces will be left even if all block data is positioned in the allocated block recording area. The data amount of orthogonal transform blocks Y0, Y2, R-Y, and B-Y is greater than the allocated orthogonal transform block recording area, however, and data that cannot be placed in the corresponding areas results. The overflow data that cannot be placed is considered "non-essential data."

Figure 3B:
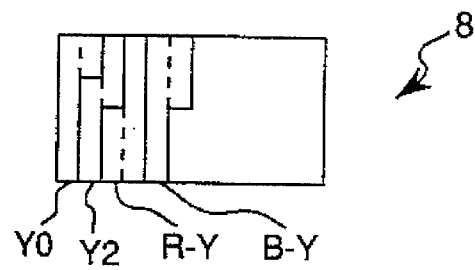

FIG. 3b shows the non-essential data for the macro block in FIG. 3a and stored in the overflow memory 8. As shown in FIG. 3b, non-essential data in this embodiment is arranged in the sequence of the orthogonal transform blocks in the macro block recording area. As shown in FIG. 2, the most visually essential luminance signal data is positioned first in the macro block recording area format in this embodiment. The next most essential R-Y color difference signal is positioned after the luminance signal data, and the least important B-Y color difference signal data is positioned last. Thus, the non-essential macro block data is arranged in the sequence of the most visually essential orthogonal transform blocks as shown in FIG. 3b.

Figure 3C:
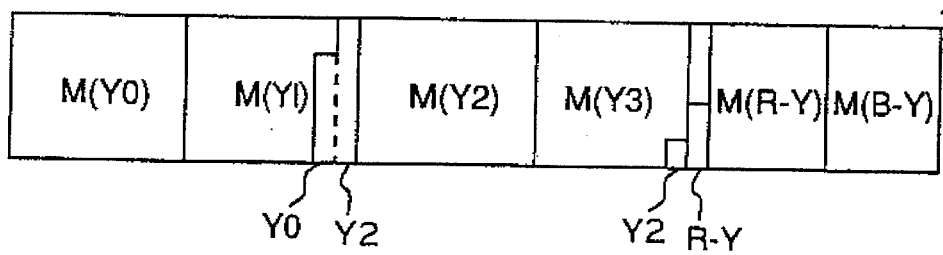

FIG. 3c shows the result of the second phase operation. The non-essential macro block data (FIG. 3b) is then positioned starting from the most essential orthogonal transform block data to the vacant spaces left in the Y1 and Y3 orthogonal transform block recording areas (FIG. 3a). As shown in FIG. 3c, all of the non-essential data for blocks Y0 and Y2 and part of the non-essential data for block R-Y is positioned in the available area. Therefore, when only the data in the macro block recording area is reproduced due to a transfer path error or high speed (trick) playback mode, all luminance signal data and all essential color difference signal data contained in this macro block can be reproduced. In other words, virtually all visually essential data can be reproduced from this macro block recording area alone. By positioning the non-essential macro block data in most-essential orthogonal transform block sequence (in luminance signal, R-Y color difference signal, and B-Y color difference signal sequence in the format shown in FIG. 2), the effects of transfer path errors can be reduced, and picture quality during high speed (trick) playback modes can be improved.

Figure 3D:
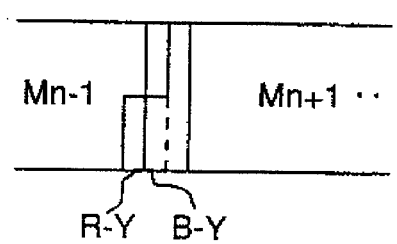

FIG. 3d illustrates the recording method applied for data ("residual data" below) remaining after filling all available macro block space with non-essential data. The residual data of the macro block shown in FIG. 3a is the remaining non-essential data of color difference signals R-Y and B-Y as shown in FIG. 3d. This residual data comprises residual data for plural macro blocks, specifically the residual data from the current macro block plus residual data from other macro blocks. In FIG. 3d, residual data for the macro block preceding the current macro block is indicated as $M_{n-1}$, and residual data for the macro block following the current macro block is indicated as $M_{n+1}$ (residual data for the current macro block is $M_n$).

Plural macro blocks of residual data as shown in FIG. 3d are placed in any macro block recording area left after all non-essential data associated with that macro block has been placed. Because this residual data is therefore not stored in the macro block with which it belongs, there is a higher possibility that this data cannot be reproduced when a transfer path error occurs or during high speed (trick) playback modes. Placement of the residual data is also executed by the memory control 6.

In a video signal recording apparatus according to the present invention as described above, the essential data in each orthogonal transform block can be reproduced independently of any errors when transfer path errors occur because the essential data of each macro block and the orthogonal transform blocks contained therein is recorded to known fixed positions (the macro block recording area and orthogonal transform block recording area).

In addition, non-essential data that could not be recorded in the orthogonal transform block recording areas and is associated with essential orthogonal transform blocks can be recorded to the same macro block recording area. As a result, non-essential data contained in the macro block and belonging to an essential orthogonal transform block can be reproduced in macro block recording areas where transfer path errors have not occurred. For example, by giving precedence in the recording format to recording the macro block luminance signal data before the color difference signal data (by increasing the orthogonal transform block recording areas for the luminance signal data and placing these recording areas at the beginning of the macro block recording area), image deterioration can be concentrated in the high frequency component even when only the data in the macro block can be used. This makes it possible to minimize actual image deterioration.

A method of reducing the effects of transfer path errors in the macro blocks has been described in this first embodiment. In the second embodiment described below, a method of reducing image deterioration throughout a single frame is described. The first step in this method is to define a signal segment as five macro blocks. One frame therefore consists of 270 segments.

Figure 4:
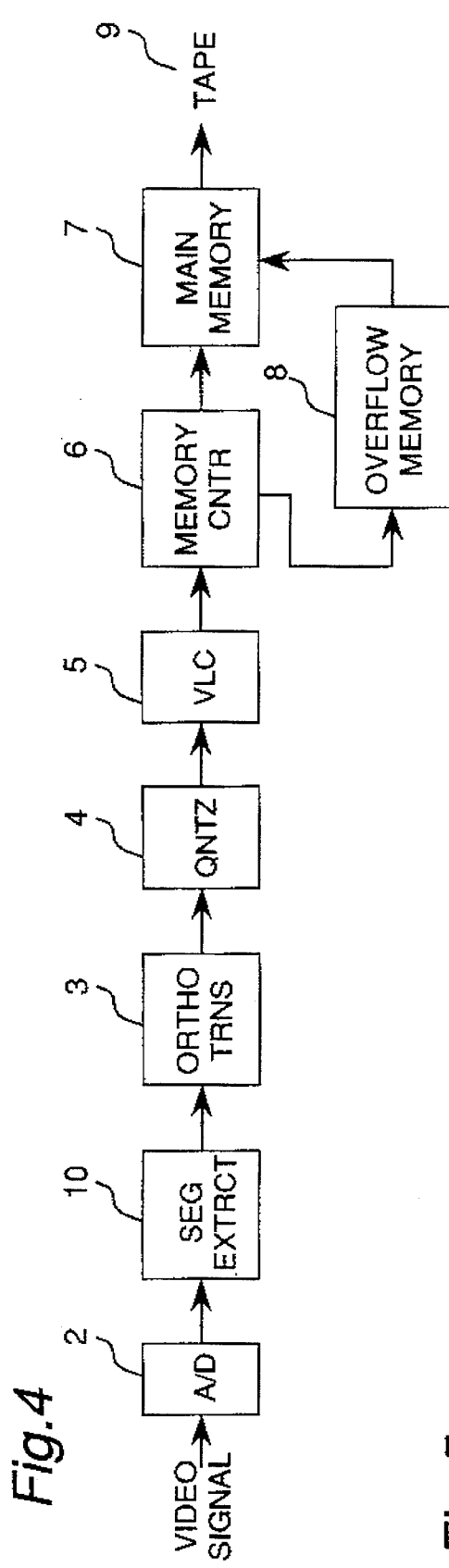
FIG. 4 is a block diagram of a video signal recording apparatus according to the second embodiment of the invention.

FIG. 4 is a block diagram of a video signal recording apparatus according to the second embodiment of the invention. As shown in FIG. 4, this apparatus further has a segment extractor 10 inserted between the A/D converter 2 and orthogonal transform processor 3.

Figure 5B:
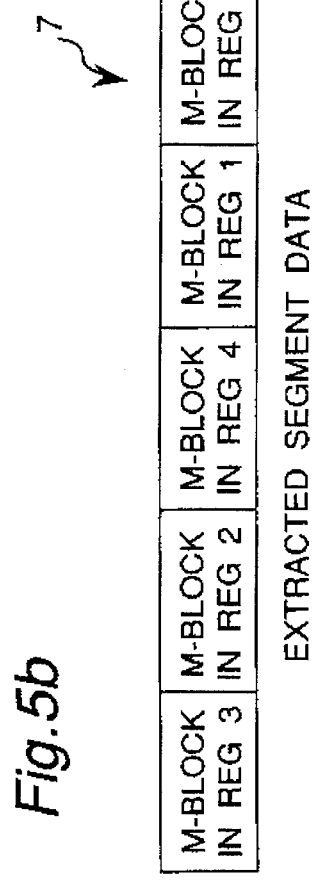
FIGS. 5a and 5b are diagrams used to describe the segment recording area and macro block recording area of the second embodiment.
Figure 5A:
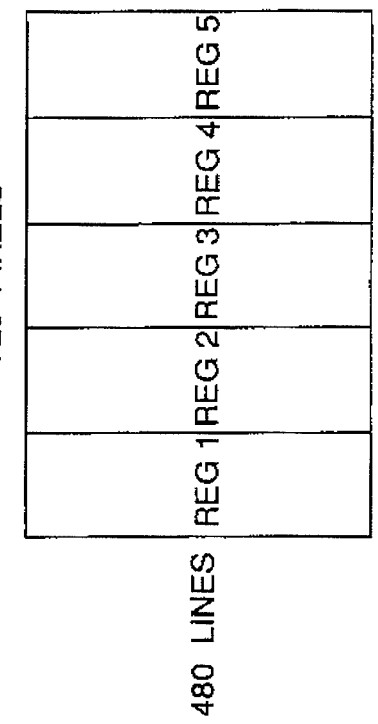

As shown in FIG. 5a, segment extractor 10 extracts one segment data from one frame data which is previously divided into five regions REG1, REG2, REG3, REG4 and REG5 each containing the same number of macro blocks. One segment data has five macro blocks aligned in a manner shown in FIG. 5b. Each segment therefore comprises 270 macro blocks. Thus, the main memory 7 according to the second embodiment has a capacity for storing at least one segment, i.e., five macro blocks, one from each region. Thus, the overflow data from one macro block can be stored in vacant spaces in a different macro block, but in the same segment. The main memory 7 may have a capacity to store more than one segment.

In other words, according to the second embodiment, one macro block is extracted from each of the above five regions to form one segment, thus yielding 270 segments/frame. A fixed-length segment recording area is also allocated to each segment. As shown in FIG. 5b, each segment recording area in the main memory 7 is divided into five macro block recording areas.

In the example shown in FIG. 5b, the entire segment recording area is allocated to the macro block recording areas included in the segment, but areas not associated with the macro block recording areas can also be reserved in the segment.

In addition, the segment recording area is allocated to record the macro blocks in order of visual importance, i.e., to record the macro blocks in sequence from the screen center to the edge in the order region 3, region 2, region 4, region 1, and region 5. Each macro block recording area format is as shown in FIG. 2, i.e., divided into fixed-length orthogonal transform block recording areas.

Since the video signal in this embodiment is recorded by segment recording area as shown in FIG. 5b, the effect of transfer path errors is thus minimized and recording suitable to high speed (trick) playback modes is made possible because the segments, macro blocks, and orthogonal transform blocks are recorded to a fixed recording position.

The method of positioning the non-essential data for the macro block of a given macro block recording area is the same as the method of the first embodiment described with reference to FIG. 3. Because of the use of variable length coding, however, non-essential data is not necessarily positioned in the same macro block recording area as was described with the first embodiment above, but can be positioned in a different macro block recording area but in the same segment.

Figure 6A:
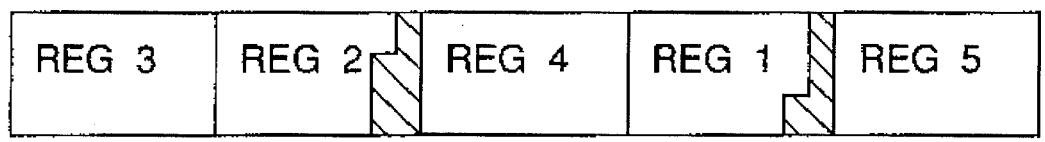
FIGS. 6a–6c are diagrams used to describe the method of recording residual data to the segments according to the second embodiment.

The method of positioning non-essential data that could not be placed in the same macro block is described using FIGS. 6a–6c below. FIG. 6a shows the segment recording areas after positioning as much non-essential data as possible in the same (associated) macro blocks.

In the example in FIG. 6a, the macro block data amount in regions 3, 4, and 5 exceeds the capacity of the macro block recording area, and data is left over. Data that cannot be placed in the same macro block is considered "residual data." The data recorded to the macro blocks in regions 2 and 1 is less than the recording area capacity, and open spaces are left even after placing all non-essential data for that macro block in the macro block recording area. The actual spaces are distributed among the orthogonal transform blocks, but are shown concentrated at the end of each macro block in FIGS. 6a–6c for simplicity.

Figure 6B:
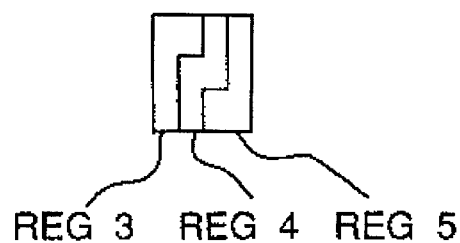

FIG. 6b shows the segment residual data formed by collecting this residual data for one segment. The segment residual data is placed in sequence from the residual data for the macro block at the beginning of the segment recording area, and is placed to vacant spaces in the segment recording area starting from the beginning thereof as shown in FIG. 6c.

Figure 6C:
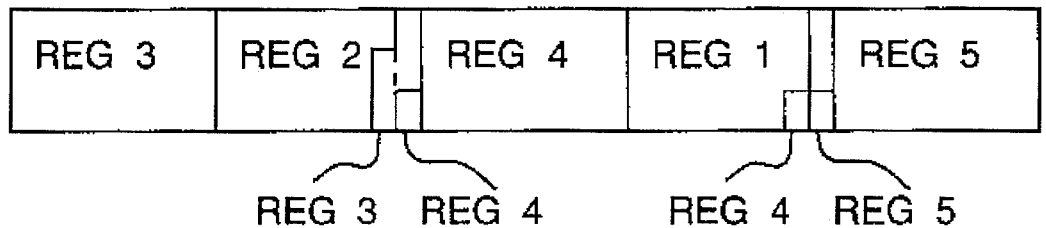

In the example shown in FIGS. 6a–6c, part of the residual data for the segment 5 macro block cannot be placed in the same segment. When all segment residual data cannot be placed in the same segment as in this example, it is possible to either not record the unplaced residual data, or to record this data to vacant spaces in another segment. Positioning the segment residual data is handled by the memory control 6 (FIG. 4).

Because variable length coding is used in this embodiment, it is not possible to decode the signal following a transfer path error. This embodiment compensates for this, however, because data is recorded in each segment in sequence from the most visually essential macro blocks (near the screen center) on screen. As a result, when a transfer path error occurs, the residual data for the most visually essential macro blocks is more resistant to interference. In other words, the effects of transfer path errors can be focused on the residual data (high frequency data) of visually non-essential macro blocks located at the screen edges. Therefore, by using the second embodiment, the effects of transfer path errors can be prevented even in a recording apparatus using variable length coding. As a result, the most visually conspicuous image deterioration can be minimized.

Note that while the recording format for a specific video signal is described in the two embodiments above, the present invention can be adapted to any other video signal or recording format. The preferred embodiments were furthermore described with reference to a video signal comprising a luminance signal and color difference signals, but the invention can also be applied to composite signals, RGB signals, and other types of audio and video signals.

The invention shall further not be limited to the configurations described above, and can be achieved in hardware or in software providing the same functions. In addition, the practical benefits of the present invention are further enhanced by the relatively simple configuration of the invention and the ability to overcome a major drawback to video signal recording apparatuses using variable length coding.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video signal recording apparatus comprising:

variable length coding means for producing a plurality of data blocks having uneven data lengths, each data block comprising end of block data at an end of said each data block and a plurality of variable length coded data, each variable length coded data accompanying a data length code indicative of a data length of a corresponding variable length code, a predetermined number of data blocks of said plurality of data blocks produced from said variable length coding means defining a macro block;

said macro block comprising a plurality of first type data blocks carrying luminance data and arranged in a most visually essential luminance signal order and a plurality of second type data blocks carrying color difference data and arranged in a most visually essential color difference signal order;

said variable length coding means producing data blocks in an order of visual importance including said plurality of first type data blocks followed by said second plurality of second type data blocks for each macro block;

first memory means having a plurality of allocated memory areas of known capacity for provisionally storing one block data in one allocated memory area;

said plurality of data blocks produced by said variable length coding means being stored in said first memory means in said order of visual importance, wherein said order of visual importance comprises arranging said data blocks in an order from a most visually essential luminance signal to a least visually essential luminance signal followed by a most essential color difference signal to a least essential color difference signal;

second memory means for storing overflow data that has overflowed from an allocated memory area;

data block length counting means for counting each data block length and for producing a maximum length signal when said variable length coding means has produced a data block having a predetermined length of data equal to a capacity of a corresponding allocated memory area;

switching means operated by said data block length counting means for directing and storing said data block to an allocated memory area before producing said maximum length signal and for directing and storing an overflow portion of said data block to said second memory means after producing said maximum length signal;

end of block data detection means for detecting end of block data and for pointing to a new allocated memory area upon detection of said end of block data, so that a vacant area is produced at an end portion of said allocated memory when said end of block data is detected before the generation of said maximum length signal;

transfer means for transferring overflow data stored in said second memory means to said vacant area; and said overflow data stored in said second memory means being transferred to a vacant area in a same macro block from which said overflow data was generated.

2. A video signal recording apparatus as claimed in claim 1, further comprising orthogonal transform means for performing an orthogonal transform with respect to input video signals in orthogonal transform blocks, and for producing blocks of orthogonal transform data which is applied to said variable length coding means.

3. A video signal recording apparatus as claimed in claim 2, further comprising a segment extractor connected to said orthogonal transform means for extracting macro blocks from different regions in a frame of the video signal, said extracted macro blocks being aligned to define a segment.

4. A video signal recording apparatus as claimed in claim 1, further comprising:

a segment extractor for extracting macro blocks from different regions of a frame of a video signal, wherein said frame is divided into a plurality of parallel regions; and a segment recording area for recording said extracted macro blocks in an order of visual importance.

5. A video signal recording apparatus according to claim 4, said order of visual importance first including a macro block extracted from a center region of said frame and next including macro blocks extracted from regions close to said center region.

6. A video signal recording apparatus according to claim 5, wherein said order of visual importance comprises a macro block extracted from said center region of said frame, followed by a macro block extracted from a region adjacent to a one side of said center region of said frame, followed by a macro block extracted from a region adjacent to an other side of said center region of said frame, and wherein additional macro blocks are extracted from regions alternating between a next closest region on said one side of said center region and a next closest region on said other side of said center region until a macro block is extracted from an extreme region on said other side of said center region.

7. A video signal recording apparatus comprising:

variable length coding means for producing a plurality of data blocks having uneven data lengths, each data block comprising end of block data at an end of said each data block and a plurality of variable length coded data, each variable length coded data accompanying a data length code indicative of a data length of a corresponding variable length code;

first memory means having a plurality of allocated memory areas of known capacity for provisionally storing one block data in one allocated memory area;

said first memory means having a capacity for storing a segment comprising a plurality of macro blocks extracted and stored in said first memory means in an order first including a macro block representing a center region of an image and next including macro blocks representing regions close to said center region;

second memory means for storing overflow data that has overflown from an allocated memory area;

said overflow data stored in said second memory means is transferred to a vacant area in any of the macro blocks in said segment;

data block length counting means for counting each data block length and for producing a maximum length signal when said variable length coding means has produced a data block having a predetermined length of data equal to a capacity of a corresponding allocated memory area;

switching means operated by said data block length counting means for directing and storing said data block to an allocated memory area before the generation of said maximum length signal and for directing and storing an overflow portion of said data block to said second memory means after the generation of said maximum length signal;

end of block data detection means for detecting end of block data and for pointing to a new allocated memory area upon detection of said end of block data, so that a vacant area is produced at an end portion of said allocated memory when said end of block data is detected before the generation of said maximum length signal; and transfer means for transferring overflow data stored in said second memory means to said vacant area.

8. A video signal recording method comprising the steps of:

(a) producing a plurality of data blocks having uneven data lengths from variable length coding means, each data block comprising end of block data at an end of said each data block and a plurality of variable length coded data, each variable length coded data accompanying a data length code indicative of a data length of a corresponding variable length code;

wherein a predetermined number of data blocks of said plurality of data blocks define a macro block;

said macro block comprising a plurality of first type data blocks carrying luminance data and arranged in a most visually essential luminance signal order and a plurality of second type data blocks carrying color difference data and arranged in a most visually essential color difference signal order;

said variable length coding means producing data blocks in an order of visual importance including said first type data blocks followed by said second type data blocks for each macro block;

(b) sending said data blocks to first memory means having a plurality of allocated memory areas of known capacity for provisionally storing one block data in one allocated memory area, said plurality of data blocks produced by said variable length coding means being stored in said first memory means in said order of visual importance wherein said order of visual importance comprises arranging said data blocks in an order from a most essential luminance signal to a least visually essential luminance signal followed by a most essential color difference signal to a least essential color difference signal;

(c) pointing to a new allocated memory area of said first memory means when said end of block data is detected, and leaving a vacant area at an end portion of an old allocated memory area of said first memory means;

(d) sending overflow data of said data blocks that have overflowed from an allocated memory area to a second memory means for storage; and (e) transferring said overflow data stored in said second memory means to said vacant area in said first memory means, said vacant area comprising a vacant area in a same macro block from which said overflow data was generated.

9. A video signal recording method as claimed in claim 8, further comprising the step of:

(f) performing an orthogonal transform by orthogonal transform means with respect to input video signals in orthogonal transform blocks; and (g) producing blocks of orthogonal transform data which is applied to said variable length coding means.

10. A video signal recording method as claimed in claim 9, further comprising the step of:

(h) extracting macro blocks, by a segment extractor connected to said orthogonal transform means, from different regions in a frame of the video signal, said extracted macro blocks being aligned to define a segment.

11. A video signal recording method as claimed in claim 8, further comprising:

dividing a frame of a video signal into a plurality of parallel regions;

extracting macro blocks from different regions of a frame of a video signal; and recording said extracted macro blocks in a segment recording area in an order of visual importance.

12. A video signal recording apparatus according to claim 11, said order of visual importance first including a macro block extracted from a center region of said frame and next including macro blocks extracted from regions close to said center region.

13. A video signal recording apparatus according to claim 12, wherein said order of visual importance comprises a macro block extracted from said center region of said frame, followed by a macro block extracted from a region adjacent to a one side of said center region of said frame, followed by a macro block extracted from a region adjacent to an other side of said center region of said frame, and wherein additional macro blocks are extracted from regions alternating between a next closest region on said one side of said center region and a next closest region on said other side of said center region until a macro block is extracted from an extreme region on said other side of said center region.

14. A video signal recording method comprising the steps of:

(a) producing a plurality of data blocks having uneven data lengths from variable length coding means, each data block comprising end of block data at an end of said each data block and a plurality of variable length coded data, each variable length coded data accompanying a data length code indicative of a data length of a corresponding variable length code;

(b) sending said data blocks to first memory means having a plurality of allocated memory areas of known capacity for provisionally storing one block data in one allocated memory area;

said first memory means has a capacity for storing a segment comprising a plurality of macro blocks extracted and stored in said first memory means in an order first including a macro block representing a center region of an image and next including macro blocks representing regions close to said center region;

(c) pointing to a new allocated memory area of said first memory means when said end of block data is detected, and leaving a vacant area at an end portion of an old allocated memory area of said first memory means;

(d) sending overflow data of said data blocks that have overflown from an allocated memory area to a second memory means for storage; and (e) transferring overflow data stored in said second memory means to said vacant area in said first memory means said overflow data stored in said second memory means is transferred to a vacant area in any macro block of said segment.

15. A video signal recording apparatus comprising:

a variable length coder for encoding information to form a plurality of data blocks having uneven lengths;

a first memory having a plurality of allocated memory areas each having a preset capacity;

a second memory coupled to said first memory storing overflow data that has overflowed from an allocated memory of said first memory;

a first storing device which stores a data block into an allocated memory area until either a maximum amount of space of said allocated memory area is occupied by said data block or an end of said data block is reached, an overflow portion of said data block resulting when the maximum amount of space of said allocated memory has been occupied, and a vacant area being produced in said allocated memory area when the end of said data block is reached;

a second storing device which stores said overflow portion of said data block into said second memory; and a transfer device which transfers overflow portions of data blocks from said second memory to vacant areas produced in said allocated memory areas.

16. A video signal recording apparatus as claimed in claim 15, wherein said first memory comprises a macro block recording area comprising a predetermined number of said plurality of data blocks;

said predetermined number comprising a plurality of first type data blocks comprising luminance data and a plurality of second type data blocks comprising color difference data;

wherein said plurality of data blocks are stored in said macro block recording area in a predetermined order of visual importance.

17. A video signal recording apparatus as claimed in claim 15, wherein said first memory comprises a segment recording area comprising a predetermined number of a plurality of macro block recording areas having data that represents different regions in a frame of the video signal;

wherein said plurality of macro block recording areas are stored in said segment recording area in a predetermined order of visual importance.

* * * * *

UNITED STATES PATENT AND TRADEMARK OFFICE
CERTIFICATE OF CORRECTION

PATENT NO. : 5,585,931
DATED : December 17, 1996
INVENTOR(S) : T. JURI et al.

It is certified that error appears in the above-indentified patent and that said Letters Patent is hereby corrected as shown below:

Title page, in section [56], "References Cited", "U.S. PATENT DOCUMENTS", line 2, change "Asoi" to ---Asai---.

At column 16, line 20 (claim 14, line 29), after "means" insert ---;---.

Signed and Sealed this

Eighth Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,585,931
DATED : December 17, 1996
INVENTOR(S) : TATSURO JURI et al.

It is certified that error appears in the above-indentified patent and that said Letters Patent is hereby corrected as shown below:

At column 15, line 41 (claim 12, line 1) change "apparatus" to ---method---.

At column 15, line 46 (claim 13, line 1) change "apparatus" to ---method---.

Signed and Sealed this

Seventeenth Day of February, 1998

*Attest:*

BRUCE LEHMAN

*Attesting Officer*     *Commissioner of Patents and Trademarks*